United States Patent
Ramachandran et al.

(10) Patent No.: US 9,609,552 B2
(45) Date of Patent: Mar. 28, 2017

(54) APPARATUS AND METHOD FOR IMPROVING DEVICE HANDOVER DURING A CALL

(71) Applicant: QUALCOMM Incorporated, San Diego, CA (US)

(72) Inventors: Shyamal Ramachandran, San Diego, CA (US); Thomas Klingenbrunn, San Diego, CA (US); Navid Ehsan, San Diego, CA (US); Amir Aminzadeh Gohari, Poway, CA (US); Min Wang, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 13/801,602

(22) Filed: Mar. 13, 2013

(65) Prior Publication Data

US 2013/0265987 A1  Oct. 10, 2013

Related U.S. Application Data

(60) Provisional application No. 61/620,356, filed on Apr. 4, 2012.

(51) Int. Cl.
*H04W 52/02* (2009.01)
*H04W 36/00* (2009.01)
(Continued)

(52) U.S. Cl.
CPC .... *H04W 36/0011* (2013.01); *H04W 36/0033* (2013.01); *H04W 52/0216* (2013.01); *H04W 72/042* (2013.01); *H04W 76/048* (2013.01)

(58) Field of Classification Search
None
See application file for complete search history.

(56) References Cited

U.S. PATENT DOCUMENTS

2011/0009121 A1  1/2011  Yu et al.
2011/0038334 A1  2/2011  Huang et al.
(Continued)

FOREIGN PATENT DOCUMENTS

EP  1915010 A2  4/2008
EP  1986458 A1  10/2008
(Continued)

OTHER PUBLICATIONS

Wikipedia, "IP Multimedia Subsystem" Apr. 30, 2012, Wikimedia, all pages.*

(Continued)

*Primary Examiner* — Kwang B Yao
*Assistant Examiner* — Adam Duda
(74) *Attorney, Agent, or Firm* — Arent Fox LLP

(57) ABSTRACT

Disclosed are methods and apparatus for improving the performance of a user equipment handover during a data call. In one aspect, a source base station determines to handover user equipment (UE) to a target base station. The source base station first determines whether the UE is in a data call prior to the handover. The source base station then modifies one or more of connected mode discontinuous reception (CDRX) and semi-persistent scheduling (SPS) parameters with the UE based on determining to handover the UE and determining that the UE is in the data call.

48 Claims, 7 Drawing Sheets

(51) Int. Cl.
    *H04W 72/04*     (2009.01)
    *H04W 76/04*     (2009.01)

(56) References Cited

U.S. PATENT DOCUMENTS

| | | |
|---|---|---|
| 2012/0127960 A1 | 5/2012 | Lei |
| 2012/0155355 A1 | 6/2012 | Kwon et al. |
| 2012/0190376 A1 | 7/2012 | Rosa et al. |
| 2012/0270557 A1 | 10/2012 | Ahluwalia |

FOREIGN PATENT DOCUMENTS

| | | |
|---|---|---|
| EP | 2120479 A1 | 11/2009 |
| WO | 2008086649 A1 | 7/2008 |
| WO | 2010002692 A1 | 1/2010 |
| WO | WO 2010/002692 * | 1/2010 |
| WO | 2011019903 A1 | 2/2011 |

OTHER PUBLICATIONS

3GPP TS 23.228 v11.4.0, "3rd Generation Partnership Project; Technical Specification Group Services and System Aspects; IP Multimedia Subsystem (IMS); Stage 2 (Release 11)", Mar. 2013, 3GPP, all pages.*
International Search Report and Written Opinion—PCT/US2013/035310—ISA/EPO—Sep. 11, 2013.

* cited by examiner

APPARATUS AND METHOD FOR IMPROVING DEVICE HANDOVER DURING A CALL

CLAIM OF PRIORITY UNDER 35 U.S.C. §119

The present Application for Patent claims priority to Provisional Application No. 61/620,356 entitled "Apparatus and Method for Improving Device Handover During a Call" filed on Apr. 4, 2012, which is incorporated in the entirety by reference herein.

BACKGROUND

Field

Aspects of the present disclosure relate generally to wireless communication systems, and more particularly, to an apparatus and method for improving the performance of a user equipment handover during a data call.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as a Node B, evolved Node B (eNB), or other access point, via transmissions on the forward and reverse links. The forward link (or downlink) refers to the communication link from the base stations to the UEs, and the reverse link (or uplink) refers to the communication link from the UEs to the base stations. This communication link may be established via a single-in-single-out, multiple-in-single-out or a multiple-in-multiple-out (MIMO) system.

UEs can establish calls with other UEs via a base station. This can include a voice call (e.g., using a circuit-switched network), a data call using voice over internet protocol (VoIP), VoIP over LTE (VoLTE) or other packet-switched technology, and/or the like. When a UE is involved in a data call, the base station can configure a radio connection/bearer carrying the call traffic using a connected mode discontinuous reception (CDRX) policy to ensure good call performance and improved battery life at the UE. Such policies allow the UE to remain in connection with the base station while powering down its radio components (and/or processing components) to conserver batter power during one or more time periods (known as sleep periods or OFF durations). The base station can pre-configure UE's sleep periods in anticipation of predictable arrival of the frames related to the data call.

In addition, the wireless network can configure semi-persistent scheduling for the UE in a data call that guarantees apriori grants for the transmission and reception of data call frames. This can reduce the amount of signaling generated and the amount of power spent in making ad hoc grant requests. For example, the predictable arrival of data call frames can be used to configure the apriori grants. In general, CDRX and scheduling schemes that guarantee apriori grants, such as semi-persistent scheduling, can improve resource utilization for data calls at a UE. Such optimizations, however, can disrupt or delay transmission of data call packets during handovers.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later Disclosed are methods and apparatus for improving the performance of a user equipment handover during a data call. In one aspect, a source base station determines to handover user equipment (UE) to a target base station. The source base station first determines whether the UE is in a data call prior to the handover. The source base station then modifies one or more of connected mode discontinuous reception (CDRX) and semi-persistent scheduling (SPS) parameters with the UE based on determining to handover the UE and determining that the UE is in the data call.

In another aspect, a target base station receives handover of the UE from the source base station. The target base station then determines that one or more memory buffers related to the UE are cleared following the handover. The target base station may then modify one or more of CDRX and SPS parameters with the UE based on determining that the one or more memory buffers are cleared.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
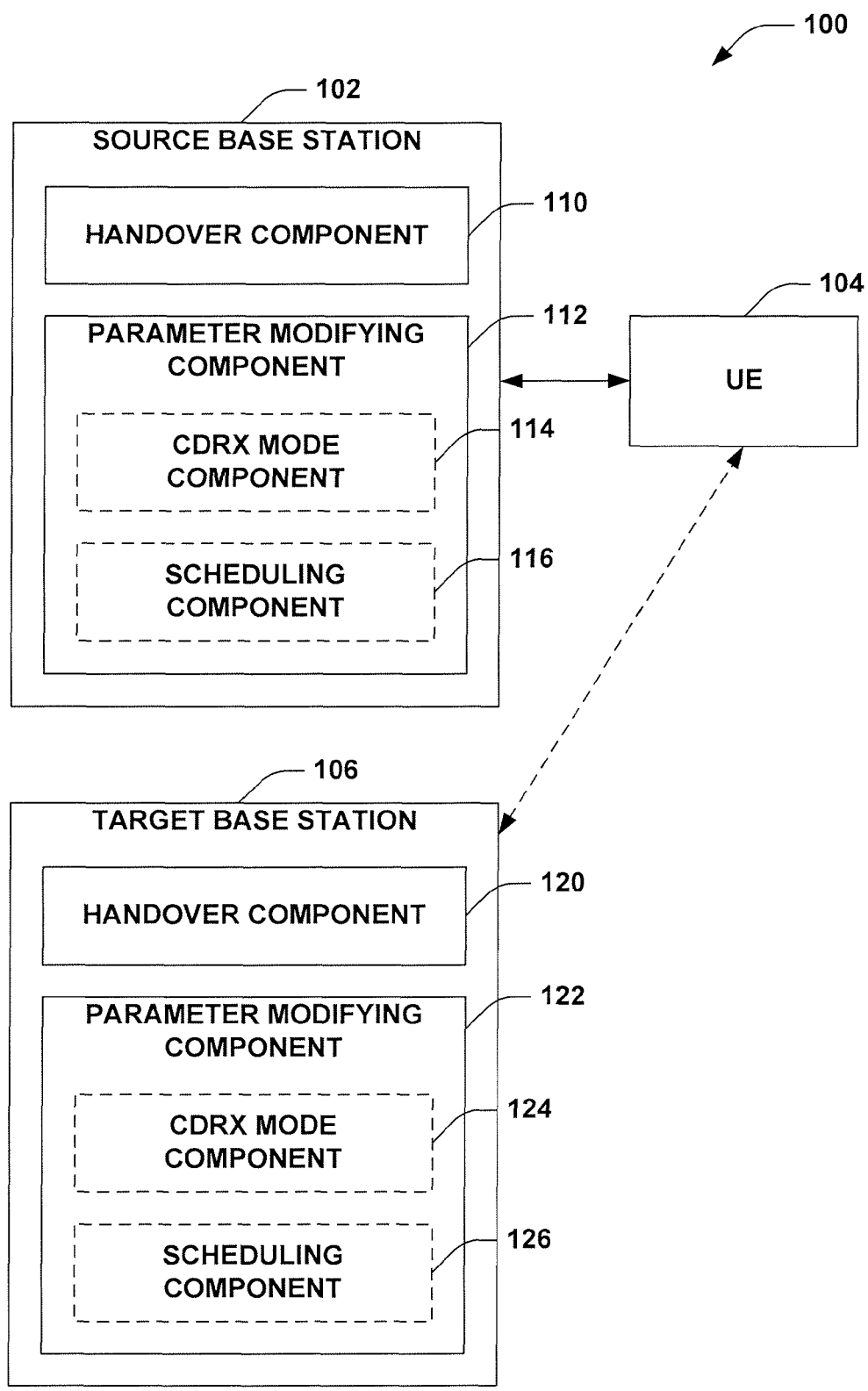
FIG. 1 illustrates an example system for modifying communication parameters of UE in a data call based on handover of the UE.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to improving performance of handover of a UE during a data call. For example, in one aspect, connection parameters for the UE can be modified based on determining that the UE is to be handed over and that the UE is in a data call. In another aspect, when a UE is operating using connected mode discontinuous reception (CDRX) or semi-persistent scheduling (SPS) during a data call, transmission of data packets can be further disrupted or delayed by the handover (e.g., where the handover is performed during scheduled transmission/reception periods). Thus, for example, when a handover decision is made for the UE, if the UE is operating in the CDRX mode, the CDRX mode can be disabled or modified at the UE to mitigate further delay associated therewith. In another example, SPS for the UE can be disabled or modified based on handover to allow for more opportune transmission grants during the handover. In either case, the UE communication parameters may be modified to result in a more active communication session during handover to prevent the UE from missing periodic transmission/reception opportunities.

Various aspects are described herein in connection with a UE, which can be a wired UE or a wireless UE. The UE can also be called a terminal, system, device, subscriber unit, subscriber station, mobile station, mobile, mobile device, remote station, remote terminal, access terminal, user terminal, terminal, communication device, user agent, user device, or user equipment device. A wireless UE can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Time Division Synchronous Code Division Multiple Access (TD-SCDMA), Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, TD-SCDMA, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Now, referring to FIG. 1, a wireless communication system 100 is illustrated that facilitates handing over a UE during a data call. System 100 includes a source base station 102 that communicates with a UE (e.g., to provide wireless network access thereto). System 100 also includes a target base station 106 that receives UE 104 in handover from source base station 102. For example, UE 104 can include a mobile terminal, a modem (or other tethered device), a network listening module (NLM) in a base station, or substantially any device that can communicate with a base station. Base stations 102 and 106 can each be a macrocell, femtocell, picocell, or similar base station, a mobile base station, a relay node, a UE (e.g., communicating in peer-to-peer or ad-hoc mode with UE 104), a portion thereof, and/or the like.

Source base station 102 includes a handover component 110 for handing a UE over to a target base station, and a parameter modifying component 112 for adjusting one or more communication parameters of the UE based at least in part on the handover. Parameter modifying component 112 can optionally include a CDRX mode component 114 for disabling or otherwise modifying CDRX in view of the handover, and/or a scheduling component 116 for modifying scheduling grants based on the handover.

Target base station 106 includes a handover component 120 for receiving handover of a UE, and a parameter modifying component 122 for adjusting one or more communication parameters based on the handover. Parameter modifying component 122 can optionally include a CDRX mode component 124 for enabling CDRX for the UE following handover, and/or a scheduling component 126 for utilizing a semi-persistent scheduling scheme (SPS) to communicate with the UE following handover.

In one aspect, source base station 102 can serve UE 104 providing wireless network access thereto. The UE 104 can communicate with source base station 102 to establish a data call with another UE (not shown). The data call can be established using, for example, a VoIP, VoLTE, or another technology. In addition, CDRX mode component 114 can enable CDRX for the data call to conserve radio resources.

In one aspect, to operate in CDRX mode, source base station 102 can provide the UE 104 with an indication of resources over which UE 104 can expect to receive communications from the source base station 102, and thus, UE 104 can power down radio resources (and/or some processing resources) during time periods within which the UE 104 is not to expect communications from the source base station 102 (referred to herein as sleep periods or OFF durations). Such modes can operate well in data call environments since packet delivery for a data call is typically predictable and periodic (e.g., similarly sized packets received at regular time intervals), as opposed to other applications which may have bursty packet delivery. In addition, allowing UE 104 to power down the radio resources in the time periods can conserve power at the UE 104.

In another aspect, scheduling component 116 can implement scheduling schemes that guarantee apriori grants for the UE 104 for transmission and/or reception of data call frames. For example, such scheduling can include indicating periodic resources over which the UE 104 can transmit and/or receive data to/from base station 102. This can further conserve battery power at the UE 104, since the UE 104 can determine when to transmit and/or receive without having to constantly receive scheduling grants from base station 102 and/or monitor resources related thereto.

Yet in an aspect, handover component 110 can determine whether and when to handover UE 104 to target base station 106. For example, handover component 110 can base this determination on receiving signal measurement reports from UE 104 and determining whether the target base station 106 can better serve UE 104 (e.g., based on a reported signal strength or quality thereof as compared to source base station 102), based on an indication from UE 104 in UE-based hand-in, and/or the like. Upon determining that UE 104 is to be handed over, handover component 110 can determine whether UE 104 is in a data call. If it is, parameter modifying component 112 can modify one or more communication parameters of the UE 104 based on the handover. For example, such communication parameters can include, but not limited to, connection parameters related to CDRX mode, semi-persistent scheduling, transmit power, modulation and coding scheme, and other communication parameters.

In another aspect, a CDRX mode component 114 can determine whether UE 104 is operating in CDRX mode based on the handover determination. If so, CDRX mode component 114 can disable CDRX mode at the UE 104 based on the handover (e.g., and switch UE 104 to a more active communication mode) to allow the source base station 102 and/or target base station 106 to actively communicate with UE 104. A CDRX transmission opportunity could otherwise pass during the handover, and the base stations 102 and/or 106 would then need to wait until a next CDRX transmission opportunity to communicate with UE 104 if CDRX mode remained active. Thus, disabling CDRX mode with UE 104 can improve data call experience at the UE 104 during handover since the base stations 102 and/or 106 need not wait for CDRX transmission opportunities to communicate with UE 104.

Yet in another aspect, the CDRX mode component 114 can maintain the CDRX mode at UE 104 while shortening the time periods in between transmission to the UE 104, and thus shortening the OFF duration during which the UE 104 can maintain powered down radio communication or processing components. In one example, CDRX mode component 114 can determine an OFF duration based on a fixed duration used for handover, a fixed decrease in OFF duration used for handover, a relative OFF duration based on a current OFF duration, and/or the like. In either case, modifying the CDRX mode can include signaling one or more instructions to UE 104 regarding the modification. Various parameters for modifying the CDRX mode can be received from the wireless network or otherwise configured at source base station 102.

In another aspect, a scheduling component 116 can be used to determine whether UE 104 is using semi-persistent scheduling based on the handover. If so, scheduling component 116 can disable the semi-persistent scheduling, such that source base station 102 and/or target base station 106 can assign resources to UE 104 over a control channel monitored by UE 104 at substantially any time (or at least at additional opportunities over the semi-persistent scheduling). Disabling the semi-persistent scheduling can include communicating an indication of the disabling to the UE 104, beginning to schedule the UE 104 more frequently, and/or the like. A semi-persistent scheduling opportunity could otherwise pass during the handover, and the UE 104 would then need to wait until a next semi-persistent scheduling opportunity to receive resources over which to communicate with base station 102 and/or 106. Similarly, the base stations 102 and/or 106 would need to wait to schedule resources for communicating to UE 104. Disabling the semi-persistent scheduling, however, allows a more frequent scheduling of resources to UE 104 such that base stations 102 and/or 106 can communicate with the UE 104 more frequently if necessary during the handover. This can similarly improve data call experience at the UE 104.

In another aspect, the scheduling component 116 can alternatively increase frequency of the semi-persistent grants to UE 104. For instance, this can include using a fixed number of grants for handover, increasing the number of grants by a fixed value for handover, increasing the number of grants relative to the current number of grants within a period of time, and/or the like. Various parameters for increasing the grants can be received from the wireless network or otherwise configured at source base station 102.

As described above, more frequent communication opportunities with UE 104 are attained by modifying communication parameters thereof during handover. For example, this can include modifying the communication parameters at UE 104 before sending the handover command thereto, including parameter modifications in a handover message (e.g., radio resource control (RRC) connection reconfiguration message, and/or the like), etc. In addition, in one aspect, scheduling component 116 can schedule additional uplink grants to UE 104 based on handover component 110 determining to handover UE 104 and determining that UE 104 is in the data call. For instance, scheduling component 116 can schedule the additional uplink grants before handover component 110 sends the handover command to the UE 104. In this aspect, the UE 104 can receive the additional uplink grants and communicate uplink control data or other data to source base station 102 before receiving the handover command. In one aspect, this can be based on whether source base station 102 sends downlink data to UE 104 before the handover command (e.g., and/or whether a response has been received from the UE 104 for the downlink data).

In another aspect, handover component 120 can receive UE 104 communications as part of the handover, and can communicate with UE 104 using substantially the same communication parameters as source base station 102 during the handover. For instance, source base station 102 can provide the communication parameters (e.g., CDRX mode parameters, scheduling parameters, etc.) to target base station 106 as context information for UE 104 during handover. Parameter modifying component 122 can set the parameters for communicating with UE 104. In another aspect, parameter modifying component 122 can set default parameters for communicating with UE 104 based on the handover (e.g., CDRX mode and semi-persistent scheduling disabled).

It is to be appreciated that, in one aspect, handover component 110 need not determine actual handover of UE 104, but can determine the UE 104 is close to handover. Depending on what measure is used to indicate handover, handover component 110 can compare the measure to a threshold near the handover threshold. For example, handover component 110 can determine that a signal strength of source base station 102 reported by UE 104 is below a threshold indicating the handover is likely. For example, this threshold can be slightly above the handover threshold signal strength. In another example, handover component 110 can determine that a difference in signal strength between source base station 102 and target base station 106 is below a threshold indicating likely handover, which can be slightly below the difference that results in handover, etc. In this regard, the communication parameters are modified in anticipation of possible handover.

In addition, for example, handover component 110 can provide the current parameters before modification, the parameters after modification, etc., to target base station 106 as context information for UE 104. Target base station 106 can use the values in configuring the parameters for communicating with UE 104.

Following handover, parameter modifying component 122 can adjust the communication parameters of UE 104 to improve data call experience (e.g., where UE 104 is still engaged in the data call following handover). Thus, in one aspect, handover component 120 can determine that handover of UE 104 is complete, and can evaluate a buffer status to determine whether any traffic related to UE 104 (e.g., downlink or uplink) remains in one or more buffers. If not, or otherwise once the buffers are cleared, parameter modifying component 122 can adjust the communication parameters of UE 104. This can include CDRX mode component 124 enabling CDRX mode with UE 104 or increasing the duration at UE 104 for which radio components can remain powered down, scheduling component 126 enabling semi-persistent or dynamic scheduling for UE 104 or decreasing the frequency of scheduling grants to UE 104, and/or the like.

In another aspect, handover component 120 can additionally determine that another handover of UE 104 is not imminent before parameters modifying component 122 modifies the parameters. For example, this can include receiving a measurement report from UE 104 and determining that signal quality of target base station 106 is at least a threshold quality, determining that signal quality of target base station 106 is at least a threshold better than another base station, determining that UE 104 has not sent an indication of UE-based hand-in over a period of time, and/or the like.

Figure 2:
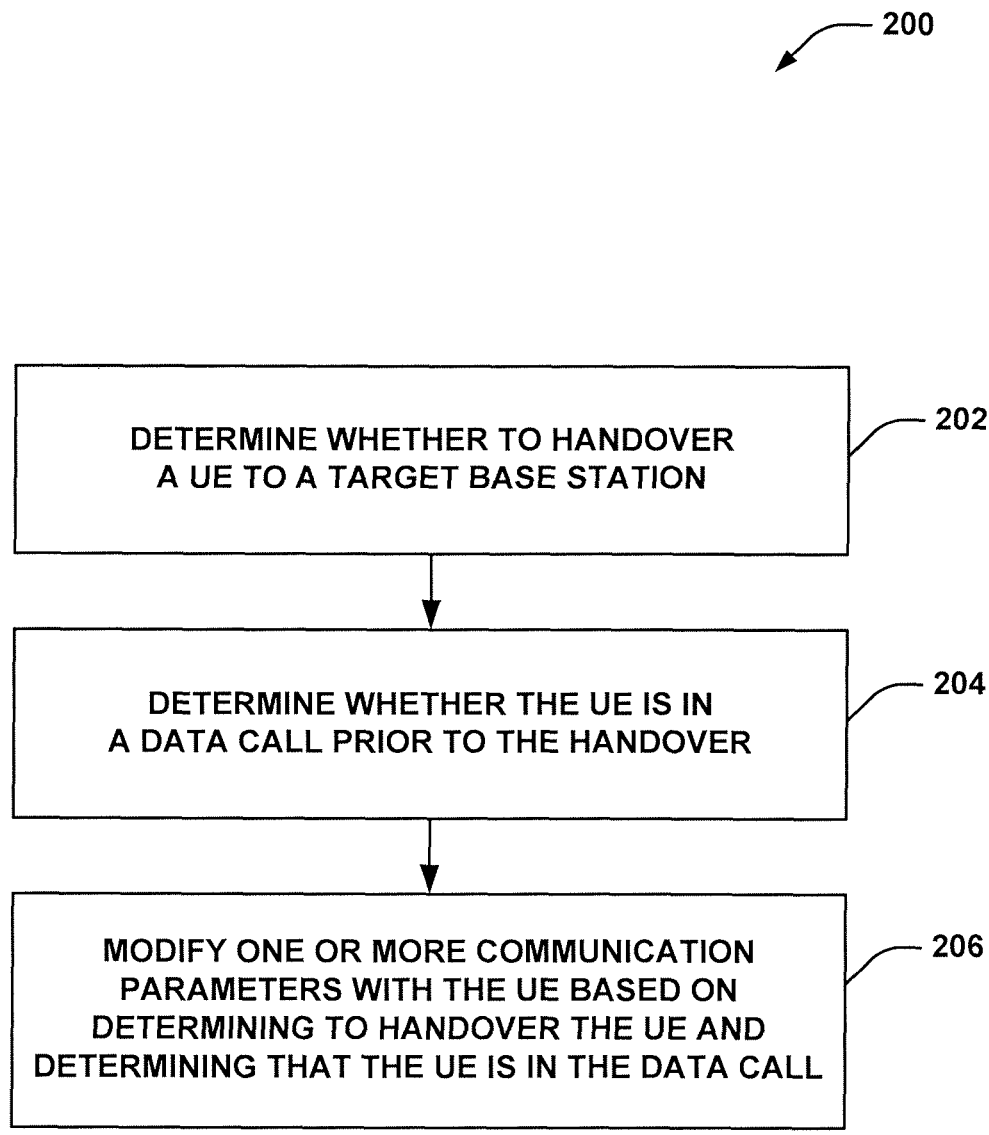
FIG. 2 illustrates one example methodology for modifying communication parameters of a UE in a data call during a handover between base stations.
Figure 3:
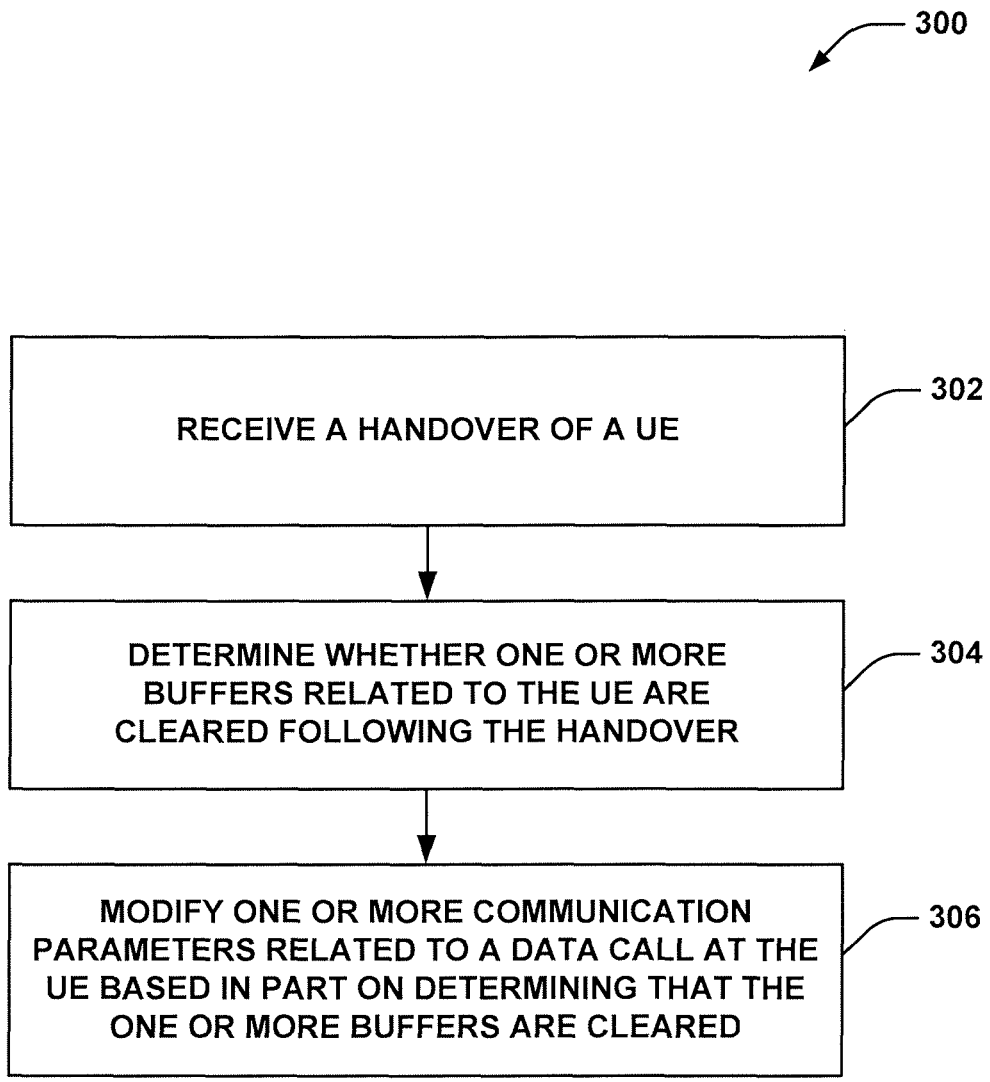
FIG. 3 illustrates another example methodology for modifying communication parameters of a UE in a data call during a handover between base stations.

Referring to FIGS. 2-3, example methodologies for modifying communication parameters of a UE handed over during a data call are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 2, an example methodology 200 for modifying communication parameters of a UE handed over during a data call is illustrated. In one aspect, the methodology 200 may be implemented by a source base station (e.g., source base station 102 of FIG. 1). At 202, a source base station can determine to handover a UE to a target base station. As described, this determination can be based on evaluating a measurement report received from the UE that indicates at least a signal strength or quality of the target base station, receiving an indication of UE-based hand-in from the UE, and/or the like. At 204, the source base station can determine that the UE is in a data call prior to the handover. In one example, this determination is made based in part on the handover. The determination can be based on whether the UE is being served with respect to a data call. In another example, the determination can include evaluating one or more communication parameters related to the UE, such as CDRX mode parameters, semi-persistent scheduling parameters, and other parameters. Moreover, the data call can correspond to a VoIP call, VoLTE call, or any other delay sensitive application. At 206, the source base station can modify one or more communication parameters with the UE based on determining to handover the UE to the source base station and determining that the UE is in the data call. As described, for example, this can include disabling a CDRX mode with the UE, shortening the OFF periods of the CDRX mode, disabling semi-persistent scheduling for the UE, increasing frequency of grants in semi-persistent scheduling, and/or the like.

Turning to FIG. 3, an example methodology 300 for modifying communication parameters of a UE handed over during a data call is illustrated. In one aspect, the methodology 300 may be implemented by a target base station (e.g., target base station 106 of FIG. 1). At 302, the target base station receives handover of a UE from a source base station. For example, this can include performing a handover procedure with the source base station to obtain UE communication parameters. At 304, the target base station can determine that one or more buffers maintained by the target base station related to the UE are cleared following the handover. For example, uplink and/or downlink buffers are maintained by the target base station for the UE, and can be used to communicate data received during the handover. At 306, the target base station may modify one or more communication parameters related to a data call at the UE based in part on determining that the one or more buffers are cleared. For example, the one or more parameters can correspond to improving the data call at the UE. For example, the data call can correspond to a VoIP call, VoLTE call, or any other delay sensitive application. In this regard, a CDRX mode, semi-persistent scheduling, etc. can be implemented for the UE once the buffers are cleared to improve data call experience, as described herein.

It will be appreciated that, in accordance with one or more aspects described herein, inferences can be made regarding determining an OFF period for CDRX mode, determining a frequency for grants in semi-persistent scheduling, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 4:
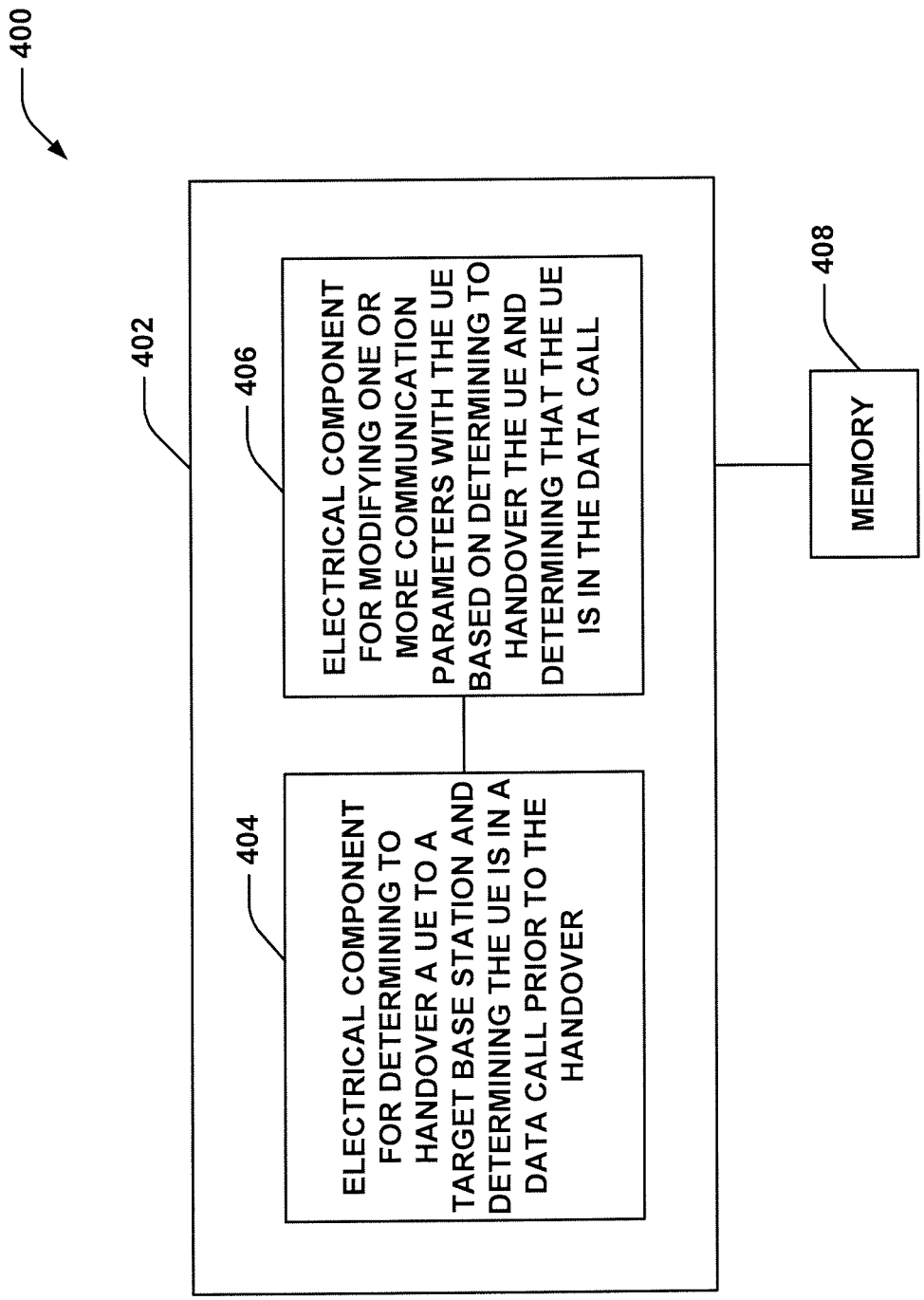
FIG. 4 illustrates an example system that modifies communication parameters of a UE in a data call during a handover between base stations.

Turning now to FIG. 4, an example system 400 is displayed for modifying parameters of a UE in a data call during handover. For example, system 400 can reside at least partially within a base station (e.g., source base station 102 of FIG. 1). It is to be appreciated that system 400 is represented as including functional blocks, which can be functional blocks that represent functions implemented by a processor, software, or combination thereof (e.g., firmware). System 400 includes a logical grouping 402 of electrical components that can act in conjunction. For instance, logical grouping 402 can include an electrical component for determining to handover a UE to a target base station and determining the UE is in a data call prior to the handover 404. Moreover, logical grouping 402 can include an electrical component for modifying one or more communication parameters with the UE based on determining to handover and determining that the UE is in the data call 406. Moreover, electrical component 404 can include a handover component 110, electrical component 406 can include a parameter modifying 112, one or more components thereof, and/or the like, in one example.

Additionally, system 400 can include a memory 408 that retains instructions for executing functions associated with the electrical components 404 and 406, stores data used or obtained by the electrical components 404 and 406, etc. While shown as being external to memory 408, it is to be understood that one or more of the electrical components 404 and 406 can exist within memory 408. In one example, electrical components 404 and 406 can comprise at least one processor, or each electrical component 404 and 406 can be a corresponding module of at least one processor. Moreover, in an additional or alternative example, electrical components 404 and 406 can be a computer program product including a computer readable medium, where each electrical component 404 and 406 can be corresponding code.

Figure 5:
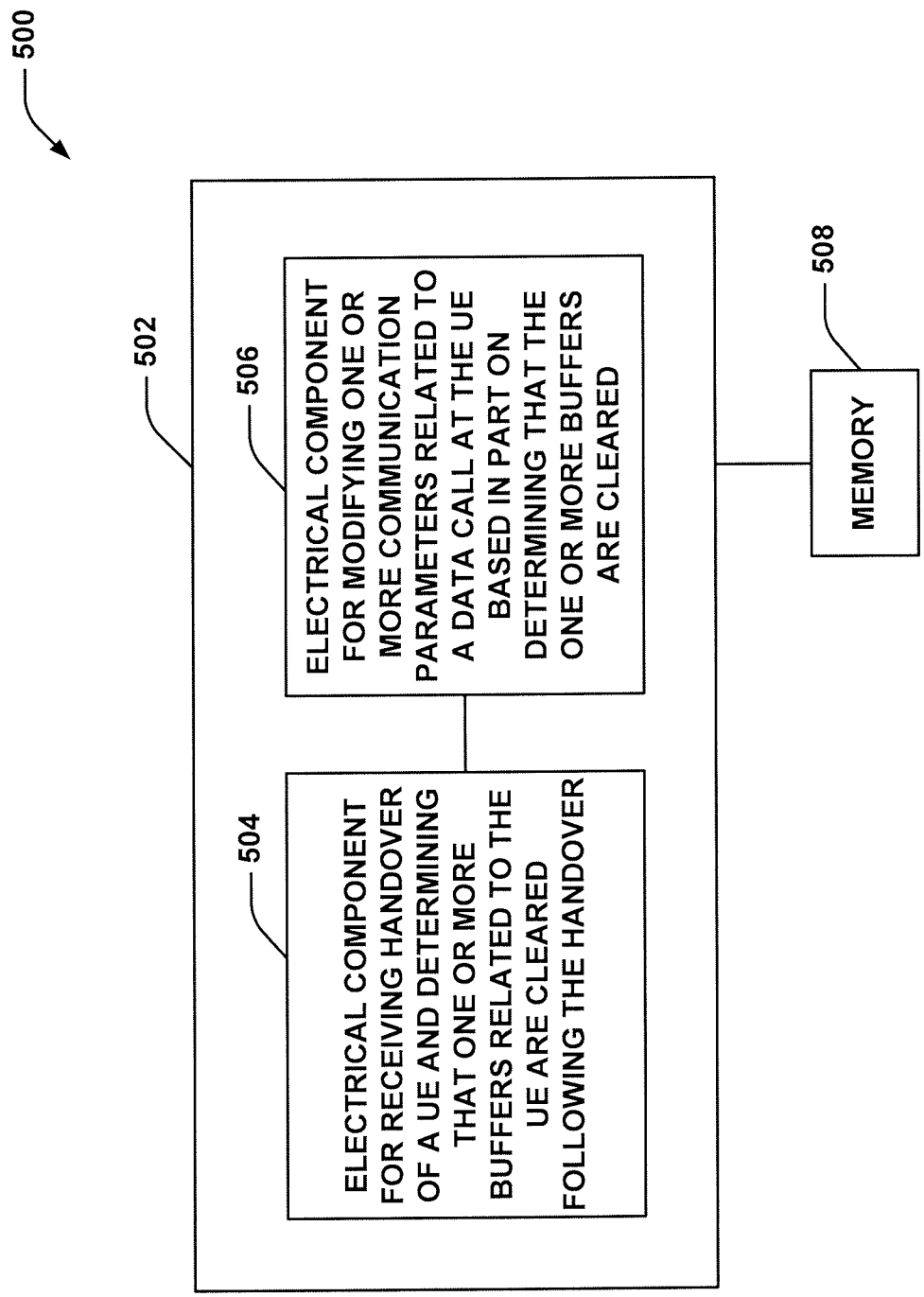
FIG. 5 illustrates an example system that for improves data call experience at a UE.

Turning now to FIG. 5, an example system 500 is displayed for improving data call experience at a UE following handover. For example, system 500 can reside at least partially within a base station (e.g., target base station 106 of FIG. 1). It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component for receiving handover of a UE and determining that one or more buffers related to the UE are cleared following the handover 504. Moreover, logical grouping 502 can include an electrical component for modifying one or more communication parameters related to a data call at the UE based in part on determining that the one or more buffers are cleared 506.

Moreover, electrical component 504 can include a handover component 120, for example, and/or electrical component can include parameter modifying component 122 or one or more components thereof, etc. Additionally, system 500 can include a memory 508 that retains instructions for executing functions associated with the electrical components 504 and 506, stores data used or obtained by the electrical components 504 and 506, etc. While shown as being external to memory 508, it is to be understood that one or more of the electrical components 504 and 506 can exist within memory 508. In one example, electrical components 504 and 506 can comprise at least one processor, or each electrical component 504 and 506 can be a corresponding module of at least one processor. Moreover, in an additional or alternative example, electrical components 504 and 506 can be a computer program product including a computer readable medium, where each electrical component 504 and 506 can be corresponding code.

Figure 6:
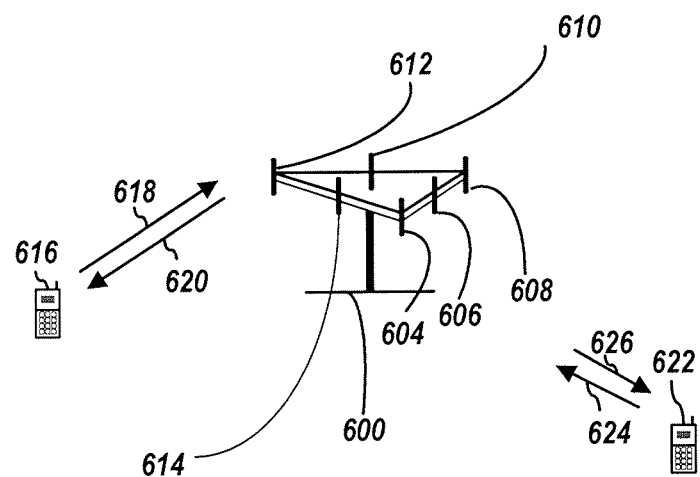
FIG. 6 illustrates a multiple access wireless communication system according to one embodiment.

Referring to FIG. 6, a multiple access wireless communication system according to one embodiment is illustrated. In one aspect, components of the wireless communication system correspond to the components of system in FIG. 1. An access point 600 (AP) includes multiple antenna groups, one including 604 and 606, another including 608 and 610, and an additional including 612 and 614. In FIG. 6, only two antennas are shown for each antenna group, however, more or fewer antennas can be utilized for each antenna group. Access terminal 616 (AT) is in communication with antennas 612 and 614, where antennas 612 and 614 transmit information to access terminal 616 over forward link 620 and receive information from access terminal 616 over reverse link 618. Access terminal 622 is in communication with antennas 604 and 606, where antennas 604 and 606 transmit information to access terminal 622 over forward link 626 and receive information from access terminal 622 over reverse link 624. In a FDD system, communication links 618, 620, 624 and 626 can use different frequency for communication. For example, forward link 620 can use a different frequency then that used by reverse link 618.

Each group of antennas and/or the area in which they are designed to communicate is often referred to as a sector of the access point. In the embodiment, antenna groups each are designed to communicate to access terminals in a sector of the areas covered by access point 600.

In communication over forward links 620 and 626, the transmitting antennas of access point 600 utilize beamforming in order to improve the signal-to-noise ratio of forward links for the different access terminals 616 and 622. Also, an access point using beamforming to transmit to access terminals scattered randomly through its coverage causes less interference to access terminals in neighboring cells than an access point transmitting through a single antenna to all its access terminals.

Moreover, access point 600 can serve access terminals 616 and 622 in a data call (e.g., VoIP, VoLTE, or any other delay sensitive application) and can provide functionality to modify communication parameters during handover to another access point, as described.

Figure 7:
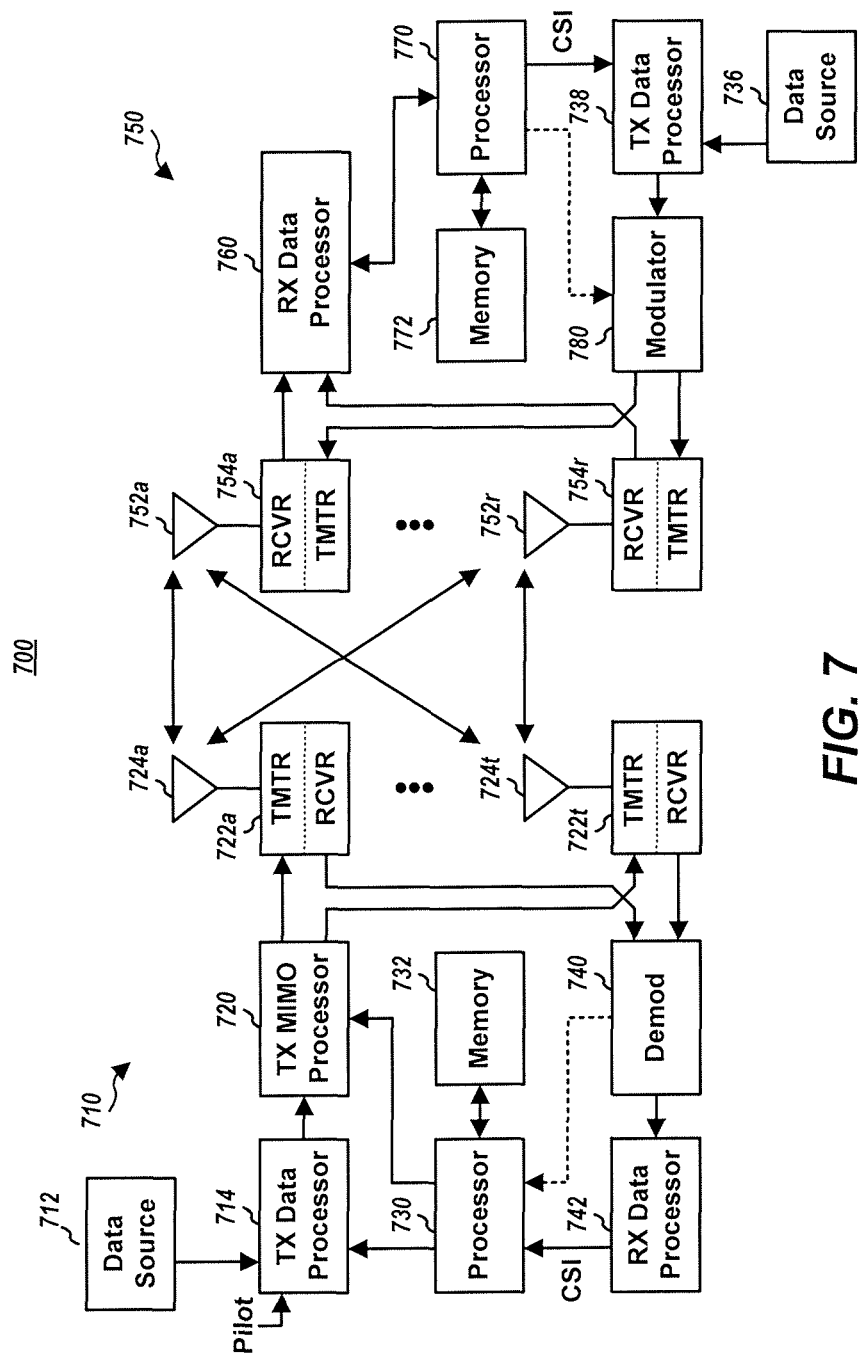
FIG. 7 illustrates a block diagram of a communication system.

FIG. 7 is a block diagram of an embodiment of a transmitter system 710 (also known as the access point, which may correspond to the base station 102 in FIG. 1) and a receiver system 750 (also known as access terminal, which may corresponds to UE 104 in FIG. 1) in a MIMO system 700. At the transmitter system 710, traffic data for a number of data streams is provided from a data source 712 to a transmit (TX) data processor 714. In addition, it is to be appreciated that transmitter system 710 and/or receiver system 750 can employ the systems (FIGS. 1 and 4-6) and/or methods (FIGS. 2 and 3) described herein to facilitate wireless communication there between. For example, components or functions of the systems and/or methods described herein can be part of a memory 732 and/or 772 or processors 730 and/or 770 described below, and/or can be executed by processors 730 and/or 770 to perform the disclosed functions.

In an embodiment, each data stream is transmitted over a respective transmit antenna. TX data processor 714 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 730.

The modulation symbols for all data streams are then provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In certain embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use. Processor 770 formulates a reverse link message comprising a matrix index portion and a rank value portion.

The reverse link message can comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beamforming weights then processes the extracted message.

Processors 730 and 770 can direct (e.g., control, coordinate, manage, etc.) operation at transmitter system 710 and receiver system 750, respectively. Respective processors 730 and 770 can be associated with memory 732 and 772 that store program codes and data. For example, processors 730 and 770 can perform functions described herein with respect to modifying parameters of a UE in a data call based on a handover of the UE to a target base station. Similarly, memory 732 and 772 can store instructions related to such, as described.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for performing handover, comprising:
   communicating, by a serving base station, with a user equipment (UE) to provide wireless network access to the UE;
   determining, by the serving base station, to handover the UE to a target base station;
   determining, by the serving base station and based at least in part on evaluating one or more parameters including one or more of connected mode discontinuous reception (CDRX) parameters or semi-persistent scheduling (SPS) parameters with the UE, whether the UE is in a data call prior to the handover, wherein the data call is at least one of a voice over internet protocol (VoIP) call or a VoIP over long term evolution (VoLTE) call; and
   modifying, by the serving base station, the one or more parameters with the UE based on determining to handover the UE and determining that the UE is in the data call.

2. The method of claim 1, wherein the modifying the one or more parameters comprises disabling a CDRX mode with the UE.

3. The method of claim 1, wherein the modifying the one or more parameters comprises adjusting an OFF duration of the CDRX mode.

4. The method of claim 1, wherein the modifying the one or more parameters comprises disabling SPS for the UE.

5. The method of claim 1, wherein the modifying the one or more parameters comprises increasing frequency of grants in the SPS for the UE.

6. The method of claim 1, wherein modifying the one or more parameters comprises assigning one or more uplink grants to the UE before sending a handover command to the UE.

7. An apparatus for performing handover, comprising:
   a memory storing one or more of connected mode discontinuous reception (CDRX) parameters or semi-persistent scheduling (SPS) parameters for a user equipment (UE);
   at least one processor coupled to the memory and configured to:
      communicate with the UE to provide wireless network access to the UE;
      determine to handover the UE to a target base station;
      determine, based at least in part on evaluating one or more parameters including the one or more of CDRX parameters or SPS parameters with the UE, whether the UE is in a data call prior to the handover, wherein the data call is at least one of a voice over internet protocol (VoIP) call or a VoIP over long term evolution (VoLTE) call; and
      modify the parameters with the UE based on determining to handover the UE and determining that the UE is in the data call.

8. The apparatus of claim 7, wherein the modifying the one or more parameters comprises disabling a CDRX mode with the UE.

9. The apparatus of claim 7, wherein the modifying the one or more parameters comprises adjusting an OFF duration of the CDRX mode.

10. The apparatus of claim 7, wherein the modifying the one or more parameters comprises disabling SPS for the UE.

11. The apparatus of claim 7, wherein the modifying the one or more parameters comprises increasing frequency of grants in the SPS for the UE.

12. The apparatus of claim 7, wherein to modify the one or more parameters comprises, the processor assigns one or more uplink grants to the UE before sending a handover command to the UE.

13. An apparatus for performing handover, comprising:
    means for communicating with a user equipment (UE) to provide wireless network access to the UE;
    means for determining to handover the UE to a target base station;
    means for determining, based at least in part on evaluating one or more parameters including one or more of connected mode discontinuous reception (CDRX) parameters or semi-persistent scheduling (SPS) parameters with the UE, whether the UE is in a data call prior to the handover, wherein the data call is at least one of a voice over internet protocol (VoIP) call or a VoIP over long term evolution (VoLTE) call; and
    means for modifying the one or more parameters with the UE based on determining to handover the UE and determining that the UE is in the data call.

14. The apparatus of claim 13, wherein the modifying the one or more parameters comprises disabling a CDRX mode with the UE.

15. The apparatus of claim 13, wherein the modifying the one or more parameters comprises adjusting an OFF duration of the CDRX mode.

16. The apparatus of claim 13, wherein the modifying the one or more parameters comprises disabling SPS for the UE.

17. The apparatus of claim 13, wherein the modifying the one or more parameters comprises increasing frequency of grants in the SPS for the UE.

18. The apparatus of claim 13, wherein modifying the one or more parameters comprises assigning one or more uplink grants to the UE before sending a handover command to the UE.

19. A non-transitory computer-readable storage medium comprising computer-executable code for performing handover, comprising:
    code for communicating, by a serving base station, with a user equipment (UE) to provide wireless network access to the UE;
    code for determining, by the serving base station, to handover the UE to a target base station;
    code for determining, by the serving base station and based at least in part on evaluating one or more parameters including one or more of connected mode discontinuous reception (CDRX) parameters or semi-persistent scheduling (SPS) parameters with the UE, whether the UE is in a data call prior to the handover, wherein the data call is at least one of a voice over Internet protocol (VoIP) call or a VoIP over long term evolution (VoLTE) call; and
    code for modifying, by the serving base station, the one or more parameters with the UE based on determining to handover the UE and determining that the UE is in the data call.

20. The non-transitory computer-readable storage medium of claim 19, wherein the code for modifying modifies the one or more parameters at least in part by disabling a CDRX mode with the UE.

21. The non-transitory computer-readable storage medium of claim 19, wherein the code for modifying modifies the one or more parameters at least in part by adjusting an OFF duration of the CDRX mode.

22. The non-transitory computer-readable storage medium of claim 19, wherein the code for modifying modifies the one or more parameters at least in part by disabling SPS for the UE.

23. The non-transitory computer-readable storage medium of claim 19, wherein the code for modifying modifies the one or more parameters at least in part by increasing frequency of grants in the SPS for the UE.

24. The non-transitory computer-readable storage medium of claim 19, wherein code for modifying modifies the one or more parameters at least in part by assigning one or more uplink grants to the UE before sending a handover command to the UE.

25. A method for performing handover, comprising:
    receiving, by a target base station, handover of a user equipment (UE);
    determining, by the target base station, whether one or more memory buffers related to downlink or uplink traffic for the UE are cleared following the handover; and
    modifying, by the target base station, one or more of connected mode discontinuous reception (CDRX) and semi-persistent scheduling (SPS) parameters with the UE based on determining that the one or more memory buffers are cleared.

26. The method of claim 25, wherein the modifying the one or more parameters comprises enabling the CDRX mode with the UE.

27. The method of claim 25, wherein the modifying the one or more parameters comprises adjusting an OFF duration of CDRX mode with the UE.

28. The method of claim 25, wherein the modifying the one or more parameters comprises enabling the SPS for the UE.

29. The method of claim 25, wherein the modifying the one or more parameters comprises decreasing frequency of grants in the SPS for the UE.

30. The method of claim 25, wherein the data call is based on voice over internet protocol (VoIP) or VoIP over long term evolution technology (VoLTE).

31. An apparatus for performing handover, comprising:
    a memory storing one or more of connected mode discontinuous reception (CDRX) and semi-persistent scheduling (SPS) parameters for a user equipment (UE);
    at least one processor coupled to the memory and configured to:
        receive handover of a user equipment (UE);
        determine whether one or more memory buffers related to downlink or uplink traffic for the UE are cleared following the handover; and
        modify one or more of CDRX and SPS parameters with the UE based on determining that the one or more memory buffers are cleared.

32. The apparatus of claim 31, wherein the modifying the one or more parameters comprises enabling the CDRX mode with the UE.

33. The apparatus of claim 31, wherein the modifying the one or more parameters comprises adjusting an OFF duration of CDRX mode with the UE.

34. The apparatus of claim 31, wherein the modifying the one or more parameters comprises enabling the SPS for the UE.

35. The apparatus of claim 31, wherein the modifying the one or more parameters comprises decreasing frequency of grants in the SPS for the UE.

36. The apparatus of claim 31, wherein the data call is based on voice over internet protocol (VoIP) or VoIP over long term evolution technology (VoLTE).

37. An apparatus for performing handover, comprising:
    means for receiving handover of a user equipment (UE);
    means for determining whether one or more memory buffers related to downlink or uplink traffic for the UE are cleared following the handover; and
    means for modifying one or more of connected mode discontinuous reception (CDRX) and semi-persistent scheduling (SPS) parameters with the UE based on determining that the one or more memory buffers are cleared.

38. The apparatus of claim 37, wherein the modifying the one or more parameters comprises enabling the CDRX mode with the UE.

39. The apparatus of claim 37, wherein the modifying the one or more parameters comprises adjusting an OFF duration of CDRX mode with the UE.

40. The apparatus of claim 37, wherein the modifying the one or more parameters comprises enabling the SPS for the UE.

41. The apparatus of claim 37, wherein the modifying the one or more parameters comprises decreasing frequency of grants in the SPS for the UE.

42. The apparatus of claim 37, wherein the data call is based on voice over internet protocol (VoIP) or VoIP over long term evolution technology (VoLTE).

43. A non-transitory computer-readable storage medium comprising computer-executable code for performing handover, comprising:
   code for receiving handover of a user equipment (UE);
   code for determining whether one or more memory buffers related to downlink or uplink traffic for the UE are cleared following the handover; and
   code for modifying one or more of connected mode discontinuous reception (CDRX) and semi-persistent scheduling (SPS) parameters with the UE based on determining that the one or more memory buffers are cleared.

44. The non-transitory computer-readable storage medium of claim 43, wherein the code for modifying modifies the one or more parameters at least in part by enabling the CDRX mode with the UE.

45. The non-transitory computer-readable storage medium of claim 43, wherein the code for modifying modifies the one or more parameters at least in part by adjusting an OFF duration of CDRX mode with the UE.

46. The non-transitory computer-readable storage medium of claim 43, wherein the code for modifying modifies the one or more parameters at least in part by enabling the SPS for the UE.

47. The non-transitory computer-readable storage medium of claim 43, wherein the code for modifying modifies the one or more parameters at least in part by decreasing frequency of grants in the SPS for the UE.

48. The non-transitory computer-readable storage medium of claim 43, wherein the data call is based on voice over internet protocol (VoIP) or VoIP over long term evolution technology (VoLTE).

* * * * *